(12) United States Patent
Meltser

(10) Patent No.: US 8,026,010 B2
(45) Date of Patent: Sep. 27, 2011

(54) ANODE EXHAUST GAS DILUTION METHOD AND APPARATUS IN PEM FUEL CELL POWERED SYSTEM

(75) Inventor: Mark A Meltser, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1696 days.

(21) Appl. No.: 10/341,765

(22) Filed: Jan. 14, 2003

(65) Prior Publication Data

US 2004/0137285 A1    Jul. 15, 2004

(51) Int. Cl.
*H01M 8/06* (2006.01)

(52) U.S. Cl. .................. 429/415; 429/423; 429/441

(58) Field of Classification Search ............. 429/13, 429/17, 415, 441, 423
See application file for complete search history.

(56) References Cited

U.S. PATENT DOCUMENTS

| | | | |
|---|---|---|---|
| 6,277,508 B1 * | 8/2001 | Reiser et al. | 429/17 |
| 6,451,466 B1 * | 9/2002 | Grasso et al. | 429/20 |
| 6,670,059 B2 * | 12/2003 | Anumu et al. | 429/17 |

* cited by examiner

*Primary Examiner* — Tracy Dove
(74) *Attorney, Agent, or Firm* — Harness, Dickey & Pierce, P.L.C.

(57) ABSTRACT

The present invention discloses a fuel cell system that reduces a hydrogen content of anode effluent exhausted by a fuel cell stack without the use of a tail gas combustor. The fuel cell system reduces the hydrogen content in one or more stages to a level suitable for venting to the environment. A first stage reduction is provided by mixing a portion of the cathode effluent with a controlled quantity of the anode effluent in the presence of a catalytic bed. The resulting stream has a reduced hydrogen content which can then be supplied to the cathode inlet side of the fuel cell stack for further hydrogen content reduction. The fuel cell system also provides a storage device to store the anode effluent to minimize pressure fluctuations between the anode and cathode sides of the fuel cell stack during a purging operation.

5 Claims, 1 Drawing Sheet

ANODE EXHAUST GAS DILUTION METHOD AND APPARATUS IN PEM FUEL CELL POWERED SYSTEM

FIELD OF THE INVENTION

The present invention relates to fuel cell systems and, more particularly, to fuel cell systems that have fuel cells that produce an anode effluent.

BACKGROUND OF THE INVENTION $H_2$—$O_2$(air) fuel cells are well known in the art and have been proposed as a power source for many applications. There are several types of $H_2$—$O_2$ fuel cells including acid-type, alkaline-type, molten-carbonate-type, and solid-oxide-type. So called PEM (proton exchange membrane) fuel cells, a.k.a. SPE (solid polymer electrolyte) fuel cells, are of the acid-type, potentially have high power and low weight, and accordingly are desirable for mobile applications (e.g., electric vehicles). PEM fuel cells are well known in the art, and include a "membrane electrode assembly" (a.k.a. MEA) comprising a thin, proton transmissive, solid polymer membrane-electrolyte having an anode on one of its faces and a cathode on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. A plurality of individual cells are commonly bundled together to form a PEM fuel cell stack.

In PEM fuel cells hydrogen is the anode reactant (i.e., fuel) and oxygen is the cathode reactant (i.e., oxidant). The oxygen can either be in a pure form (i.e., $O_2$), or air (i.e., $O_2$ mixed with $N_2$). The solid polymer electrolytes are typically made from ion exchange resins such as perfluoronated sulfonic acid. The anode/cathode typically comprise finely divided catalytic particles (often supported on carbon particles) admixed with proton conductive resin.

During the conversion of the anode reactant and cathode reactant to electrical energy, the fuel cell, regardless of the type, produces anode and cathode effluents that are exhausted from the fuel cell. The anode effluent typically contains unused hydrogen that may be at a concentration that prohibits venting the anode effluent to the environment. The cathode effluent typically contains excess oxygen or air that was not consumed during the electricity production in the fuel cell. The amounts of hydrogen and oxygen remaining in the anode and cathode effluents is dependent upon a number of factors and will vary. For example, the efficiency of the fuel cell can impact the amount of hydrogen and oxygen that are exhausted in the respective anode and cathode effluents. Additionally, the stoichiometry of the fuel cell stack (i.e., the amounts of hydrogen and oxygen that are included in the respective anode and cathode reactants) will also effect the amount of remaining hydrogen and oxygen in the respective anode and cathode effluents.

One of the methods to operate a fuel cell stack is with the anode side of the fuel cell stack deadheaded. That is, the anode effluent produced in the anode side of the fuel cell stack is not allowed to leave the fuel cell stack on a continuous basis. Rather, the anode reactant is supplied to the anode side of the fuel cell stack and remains, under pressure, in the fuel cell stack to consume the majority of the hydrogen during the production of electricity. However, when nitrogen is also present on the anode side of the fuel cell stack, the nitrogen can accumulate to an amount that diminishes the performance of the fuel cell stack. This is caused by the nitrogen preventing the hydrogen from getting to the membrane and inhibiting and/or preventing the production of electricity. Thus, the nitrogen can act as a barrier between the hydrogen and the membrane. Therefore, the anode side of the fuel cell stack is purged from time to time in what is known as a "burping" operation. The purging is done by opening the anode side and allowing the anode effluent to flow out of the fuel cell stack while new fuel, under pressure, is supplied to the anode side inlet. The purging of the anode effluent from the fuel cell stack pulls the nitrogen with it and allows the membrane to become substantially free from the nitrogen and be replenished with hydrogen so that efficient electrical energy production can commence again.

During this purging operation, however, significant amounts of hydrogen can be released in the anode effluent such that the anode-effluent has a hydrogen content that prohibits the venting of the anode effluent to the environment. Therefore, the hydrogen content in the anode effluent must be reduced prior to venting the anode effluent to the environment. Another consideration in the purging operation is that when the anode side of the fuel cell stack is purged, significant pressure differential between the anode and cathode sides can occur. If the pressure differential is of a sufficient magnitude, the membrane separating the anode and cathode sides of the fuel cell stack can be damaged. Additionally, repeated exposure to a pressure differential of a sufficient magnitude can also cause fatigue in the membrane which can lead to premature failure of the fuel cell stack. It is desirable to take these concerns into account when designing and operating a fuel cell system.

Because the hydrogen in the anode effluent may be of a concentration that prohibits venting to the environment directly, typical fuel cell systems employed a tail gas combustor to reduce the hydrogen content in the anode effluent to a level that allows venting to the environment. The tail gas combustor converts the hydrogen into heat that can be used in other parts of the fuel cell system. However, the heat generated by the combustor may only be needed during certain aspects of operating the fuel cell system, such as at startup, and thereafter the tail gas combustor becomes a source of heat that must be dissipated from the fuel cell system. The use of a tail gas combustor also requires complex controls and/or control schemes. The use of a tail gas combustor can also cause pressure differentials when the anode effluent is exhausted to the tail gas combustor such that rupture and/or fatigue of the membrane that separates the anode and cathode sides of the fuel cell stack can occur. These above considerations increase the complexity of a fuel cell system incorporating a tail gas combustor.

Thus, it is desirable to provide a fuel cell system that reduces the hydrogen content in an anode effluent without the use of a tail gas combustor and without subjecting the fuel cell stack to pressure differentials that result in premature failure of the fuel cell stack. Furthermore, it is desirable to accomplish this with a minimal complexity and need for additional controls.

SUMMARY OF THE INVENTION

The present invention eliminates the need for a tail gas combustor in a fuel cell system. The invention allows excess hydrogen in the anode effluent to be reduced without thermal combustion. The present invention also allows the fuel cell stack to be purged without subjecting the fuel cell stack to significant pressure differentials that can lead to premature failure of the fuel cell stack.

A fuel cell system according to the principles of the present invention comprises a fuel cell stack operable to convert hydrogen and an oxidant into electricity, a hydrogen-containing anode effluent, and an oxidant containing cathode effluent. The system has a pressurized storage device that receives the anode effluent from the fuel cell stack. The pressurized storage device maintains a pressure differential between an anode side of the fuel cell stack and the storage device below a predetermined value. The pressurized storage device supplies the anode effluent to a downstream component in the fuel cell system.

In another aspect, a fuel cell system, according to the principles of the present invention, comprises a fuel cell stack operable to convert hydrogen and an oxidant into electricity, a hydrogen-containing anode effluent, and an oxidant-containing cathode effluent. There is a catalytic combustion device that receives at least a portion of the anode effluent and also receives at least a portion of the cathode effluent. The catalytic combustion device is operable to catalytically combust a portion of the hydrogen of the anode effluent. The catalytic combustion device has an inlet for receiving the anode and cathode effluents and an outlet for discharging the combusted effluent. There is a flow path from the combustion device outlet to a cathode side of the fuel cell stack. The cathode side of the fuel cell stack receives the combusted effluent and an oxidant. At least one membrane electrode assembly forms a part of the fuel cell stack. The membrane electrode assembly comprises a cathode having a catalyst operable to catalytically oxidize at least a portion of a hydrogen content of the combusted effluent.

The principles of the present invention also provide a method of operating a fuel cell system. The method includes: (1) mixing a hydrogen-containing anode effluent exiting a fuel cell stack with an oxidant to form a fluid stream; (2) reducing a hydrogen content of the fluid stream by catalytically combusting a portion of the hydrogen in the fluid stream; and (3) supplying the combusted fluid stream and supplying an oxidant stream to a cathode side of the fuel cell stack.

In another aspect according to the principles of the present invention, a different method of operating a fuel cell system is disclosed. The method includes: (1) routing a hydrogen-containing anode effluent from a fuel cell stack to a pressurized storage device; and (2) selectively supplying the anode effluent in the storage device to a downstream component in the fuel cell system.

In yet another aspect according to the principles of the present invention, a method of operating a fuel cell system is disclosed. The method includes: (1) selectively supplying a hydrogen-containing anode effluent from an anode side of a fuel cell stack to a cathode side of the fuel cell stack; (2) supplying an oxidant stream to the cathode side of the fuel cell stack; and (3) reducing a hydrogen content of the anode effluent in the anode side of the fuel cell stack by catalytically reacting the anode effluent in the cathode side of the fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawing, wherein.

DETAILED DESCRIPTION OF THE PREFERRED EMBODIMENT

Figure 1:
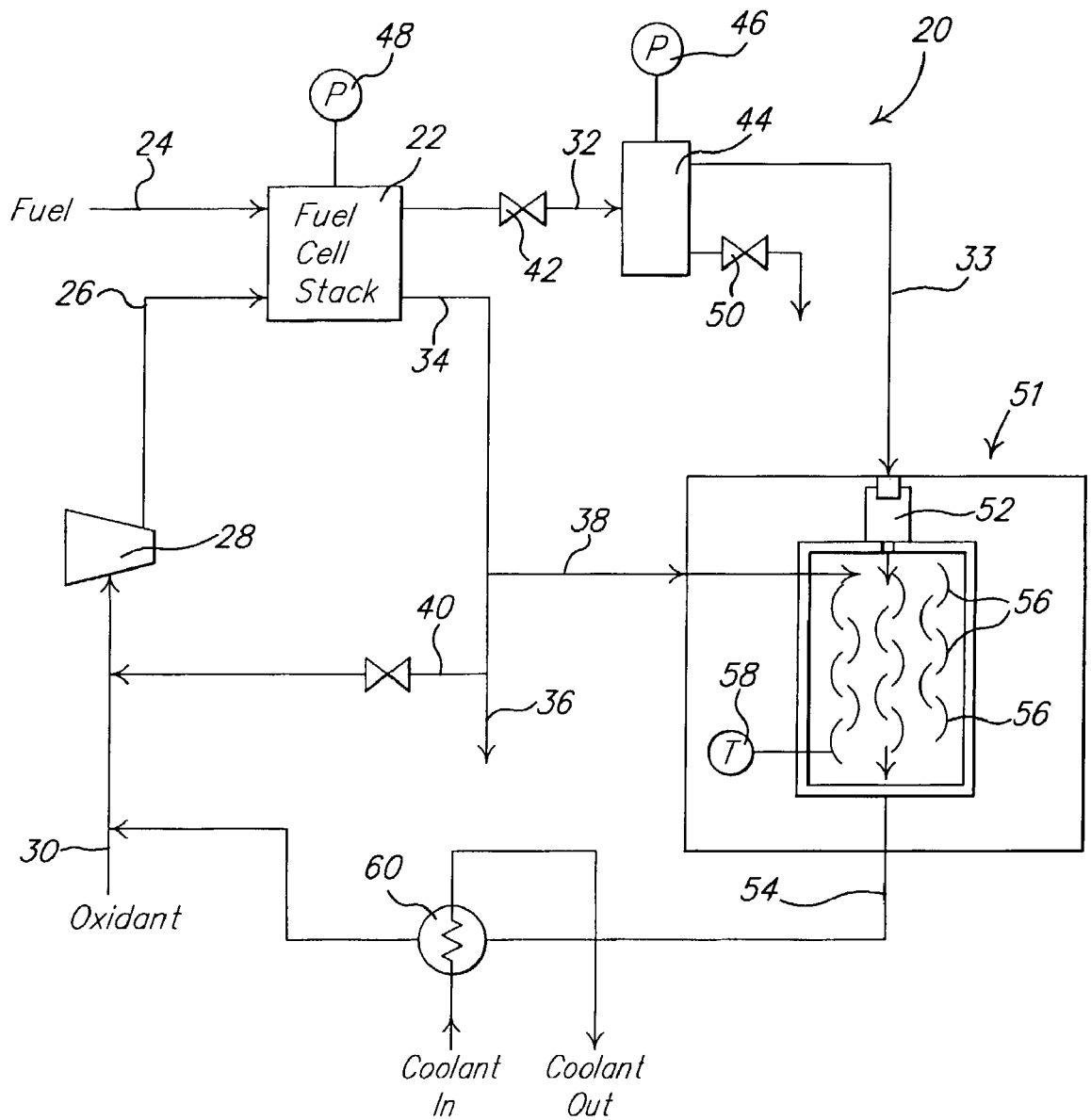
FIG. 1 is a simplified graphical representation of a fuel cell system according to the principles of the present invention.

The following description of the preferred embodiment is merely exemplary in nature and is in no way intended to limit the invention, its application, or uses.

A fuel cell system 20 according to the principles of the present invention is shown in FIG. 1. Fuel cell system 20 includes a fuel cell stack 22 having anode and cathode sides. A hydrogen-containing anode or fuel stream 24 is supplied to the anode side of fuel stack 22. An oxidant-containing cathode stream 26 is provided to the cathode side of fuel cell stack 22. Cathode stream 26 is provided by compressor 28 which pulls or sucks an oxidant stream 30 from the atmosphere and/or environment in which fuel cell system 20 is employed. Oxidant stream 30 can be supplemented by additional streams, as discussed below. Fuel stream 24 and cathode stream 26 react in fuel cell stack 22 to produce electricity, an anode effluent 32 and a cathode effluent 34. Anode effluent 32 will contain unreacted hydrogen, nitrogen, water and possibly other components. Cathode effluent 34 contains unreacted oxidant (oxygen), nitrogen, water and possibly other components. Cathode effluent 34 can be vented to the atmosphere and/or environment in which fuel cell system 20 is employed via stream 36, used to reduce a hydrogen content of anode effluent 32 via stream 38, as discussed in more detail below, and/or used to supplement oxidant stream 30 via stream 40.

A valve 42 or similar type device is operable to control the release of anode effluent 32 from the anode side of fuel cell stack 22. Valve 42 is normally closed thereby preventing anode effluent 32 from flowing out of the anode side of fuel cell stack 22. By preventing flow out of the anode side of fuel cell stack 22, more of the hydrogen within the fuel cell stack 22 can be consumed resulting in more energy production and higher efficiency. Intermittently, valve 42 will be opened to allow anode effluent 32 to flow from the anode side of fuel cell stack 22, in what is known as a purging operation. The purging operation flushes out the anode side of fuel cell stack 22 thereby removing nitrogen that has attached to the membranes in the individual fuel cells and inhibited the consumption of hydrogen and the continued production of electricity.

During the purging operation, valve 42 is opened while fuel stream 24 is provided to fuel cell stack 22 which forces/pushes anode effluent 32 out of the anode side of fuel cell stack 22. Anode effluent 32 flows to a storage device 44, which, in this case is in the form of an accumulator, is pressurized by the anode effluent 32. Accumulator 44 is operated to store anode effluent 32 and to smooth out pressure fluctuations between the anode and cathode sides of fuel cell stack 22 during a purging operation. That is, the pressure in accumulator 44 is maintained at a sufficient level so that a pressure difference or differential between accumulator 44 and the anode side of fuel cell stack 22 is below a predetermined level. By maintaining the pressure differential between the accumulator 44 and anode side of fuel cell stack 22 below a sufficient level, the pressure differential between the anode and cathode sides of the fuel cell stack 22 when the purging operation occurs can be controlled thus preventing and/or minimizing the possibility of the membrane separating the anode and cathode sides from rupturing and/or premature failure due to fatigue stresses. The predetermined value of the pressure differential will vary depending upon the design, construction and operating conditions of fuel cell stack 22. Preferably, the pressure differential is maintained substantially constant. To facilitate controlling the pressure differential between accumulator 44 and the anode side of fuel cell stack 22, pressure transducers 46 and 48 are provided on the respective accumulator and anode side of fuel cell stack 22 that can be connected to a controller that controls the purging operation. Alternatively, pressure transducers 46 and 48 can be provided on respective downstream and upstream sides of valve 42 to detect the pressure differential between accumulator 44 and the anode side of fuel cell stack 22.

Accumulator 44 can also act as a separator. Accumulator 44 acts as a separator when anode effluent within accumulator 44 is stored for a sufficient duration of time to allow particles or droplets constituting the anode effluent 32 to separate via gravity. When separation occurs, water will condense at the bottom of accumulator 44 while nitrogen will be the next layer and hydrogen will be accumulated on the top. The performance of accumulator 44 as a separator will vary depending upon various factors. For example, factors that influence the performance of accumulator 44 as a separator include, but are not limited to the duration of time anode effluent 32 remains stationary in accumulator 44, movement or bouncing of accumulator 44 (in the case of mobile applications), the pressure, temperature and the composition of anode effluent 32. When accumulator 44 acts as a separator, a valve 50 is provided at a lower end of accumulator 44 to remove the accumulated water from the bottom of accumulator 44. It should be understood, however, that accumulator 44 does not need to operate as a water separator to be within the scope of the present invention and that the use of accumulator 44 as a separator will depend upon the design and desired operation of fuel cell system 20.

Anode effluent 32 in accumulator 44 flows from accumulator 44 to a mixing device 51 via fluid stream 33. When accumulator 44 is operated as a separator, fluid stream 33 is drawn from a top portion of the accumulator to extract the hydrogen layer from the accumulator 44 so that fluid stream 33 is substantially a hydrogen-containing flow. Thus, fluid stream 33 can be the same as anode effluent 32 or primarily a hydrogen-containing flow when accumulator 44 is operated as a separator. The quantity and/or rate of fluid stream 33 flowing from accumulator 44 to mixer 51 is controlled. Controlling the flow of fluid stream 33 from accumulator 44 to mixer 51 can be by a variety of means. For example, an injector 52 can be used to controllably inject fluid stream 33 from accumulator 44 into mixer 51. Injector 52 can come in a variety of forms. For example, injector 52 can be an electromagnetic injector, similar to those used as a fuel injector in an automobile. Because injector 52 controls the quantity and rate at which fluid stream 33 flows from accumulator 44 to mixer 51, injector 52 can be operated to maintain a pressure in accumulator 44 of a sufficient magnitude to maintain the pressure differential between accumulator 44 and the anode side of fuel cell stack 22 below the predetermined level, as discussed above. Furthermore, injector 52 can also be operated to maintain a temperature in mixer 52 below a predetermined level, as discussed below. Additionally, injector 52 also serves as a check valve and prevents fluid in mixer 51 from flowing into accumulator 44.

In addition to receiving the hydrogen-containing fluid stream 33, mixer 51 also receives a portion of the oxidant-containing cathode effluent 34 via stream 38. Cathode effluent 34 exits fuel cell stack 22 under pressure (typically about 2 Bars). Mixer 51 is operated at atmospheric pressure or a pressure lower than the cathode effluent 34 pressure to facilitate receiving the portion of the cathode effluent 34. Fluid stream 33 and cathode effluent stream 38 are mixed together in mixer 51 to form a fluid stream 54. To facilitate the mixing of fluid stream 33 and cathode effluent stream 38, mixer 51 provides a tortuous path that causes the two flows to mix together and form fluid stream 54. The tortuous path can be provided in a variety of ways. For example, mixer 51 can be provided with a plurality of baffles 56 through which the flows must travel and mix together to form fluid stream 54. Mixer 51 also serves as a catalytic combustion device wherein the hydrogen content of fluid stream 54 is reduced by catalytically combusting a portion of the hydrogen with the oxidant (oxygen) that is supplied via the cathode effluent stream 38. The catalytic combustion can be provided in a variety of ways. For example, baffles 56 can be coated with a catalyst so that as the fluids mix together and flow around baffles 56, the fluid stream 54 also catalytically combusts and the hydrogen content is reduced. Alternatively, and/or additionally, mixer 51 can be provided with a catalyst bed through which fluid stream 54 flows prior to exiting mixer 51.

Because the catalytic combustion of the hydrogen in the anode effluent 32 with the oxygen in the cathode effluent stream 38 is exothermic, a temperature probe 58, such as a thermal couple, is provided in mixer 51 and measures the temperature of fluid stream 54. The temperature of fluid stream 54 can be controlled by controlling the amount of fluid stream 33 supplied to mixer 51. As stated above, injector 52 controls the quantity and/or rate of fluid stream 33 flowing to mixer 51 and can be operated to maintain a temperature of fluid stream 54 below a predetermined value. Thermal combustion (flame combustion or propagation) of the typical composition of fluid stream 54 can occur at about 800-900° F. Accordingly, it is preferred that injector 52 control the quantity of anode effluent 32 flowing to mixer 51 so that the temperature of fluid stream 54 remains below a predetermined value that prevents thermal combustion. Thus, mixer 51 is operated to promote a chemical reaction between hydrogen in fluid stream 33 and oxygen in the cathode effluent stream 38 to reduce the hydrogen content of fluid stream 54 exiting mixer 51. Mixer 51 thereby provides a first stage reduction of the hydrogen content in fluid stream 33 exhausted by fuel cell stack 22. As used herein, mixer 51 functions as a catalytic combustor where oxygen oxidizes hydrogen under conditions where conventional thermal combustion and/or flame propagation are avoided. Such conditions are avoided by conducting catalytic oxidation combustion at a temperature insufficient to support a flame. Mixer 51 may be an integral mixing chamber and catalytic combustion chamber, or separate mixing and combustion zones may be used. Preferably, mixer 51 is constructed and operated so that mixing and catalytic combustion occur essentially simultaneously, and the catalytic combustion continues as the mixture moves through device 51.

Fluid stream 54 flows from mixer 51 at the atmospheric pressure (pressure of mixer 51) and flows through a heat exchanger 60 wherein, depending on the temperature of fluid stream 54, heat is removed from fluid stream 54 so that a desired temperature of fluid stream 54 is obtained prior to joining oxidant stream 30 upstream of compressor 28. Heat exchanger 60 is preferably operated to reduce the temperature of fluid stream 54 to less than about 15° F. above the ambient temperature of oxidant stream 30. It should be understood, however, that the desired temperature of fluid stream 54 exiting heat exchanger 60 can vary depending upon the design and desired operation of fuel cell system 20. After flowing through heat exchanger 60, fluid stream 54 joins oxidant stream 30 upstream of compressor 28. Because oxidant stream 30 is pulled or sucked into compressor 28, fluid stream 54 can be added to oxidant stream 30 via a venturi effect device (not shown). Compressor 28 thoroughly mixes oxidant stream 30 with fluid stream 54 to form cathode stream 26 which is supplied to the cathode side of fuel cell stack 22. Because fluid stream 54 can contain some hydrogen, the cathode stream 26, when comprised of fluid stream 54 along with oxidant stream 30, contains hydrogen that is further consumed in fuel cell stack 22. That is, fuel cell stack 22 provides a second stage hydrogen reduction wherein a portion of the hydrogen in cathode stream 26 is oxidized to water at the catalyst on the cathode side of fuel cell stack 22 so that the hydrogen content of cathode effluent 34 exiting the cathode side of fuel cell stack 22 is at a level that allows cathode effluent 34 to be vented to the environment and/or atmosphere within which fuel cell system 20 is operated via stream 36. Preferably, the hydrogen content of cathode effluent 34 exiting the cathode side of fuel cell stack 22 is less than about 4% by volume. Even more preferably, the fuel cell stack 22 is operated to provide a hydrogen content in the cathode effluent 34 of less than about 2% and more preferably approaches about 0% by volume.

Thus, fuel cell system 20 according to the principles of the present invention provides two separate stages of hydrogen reduction that reduces the hydrogen content that is exhausted by the fuel cell stack 22 in the anode effluent 32. The two-stage reduction is accomplished by providing simple, primarily passive devices that do not require complex or intricate control schemes nor expensive structures. Additionally, the two-stage reduction is performed without high temperatures being generated through the avoidance of thermal combustion and a tail gas combustor. Additionally, the hydrogen content is reduced to a sufficient level that allows for the venting of the effluent streams to the atmosphere and/or environment within which the fuel cell system 20 is employed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a fuel cell system comprising:
    (a) selectively supplying hydrogen-containing anode effluent from an anode side of a fuel cell stack to an accumulator;
    (b) storing said anode effluent in said accumulator;
    (c) routing said stored anode effluent from said accumulator to a catalytic combustion device;
    (d) maintaining a pressure difference between said accumulator and said anode side of said fuel cell stack below a predetermined value;
    (e) selectively mixing said hydrogen-containing anode effluent from said accumulator with an oxidant-containing cathode effluent from a cathode side of said fuel cell stack to form a fluid stream;
    (f) reducing a hydrogen content in said fluid stream by catalytically combusting a portion of said hydrogen in said fluid stream in said catalytic combustion device;
    (g) selectively supplying said fluid stream from said catalytic combustion device to said cathode side of said fuel cell stack;
    (h) supplying an oxidant stream to said cathode side of said fuel cell stack; and
    (i) further reducing said hydrogen content in said fluid stream in said cathode side of said fuel cell stack by catalytically reacting said fluid stream in said cathode side of said fuel cell stack,
    wherein steps (e) and (f) are conducted essentially simultaneously by mixing said anode effluent with said cathode effluent in a mixing chamber containing a catalyst within said catalytic combustion device and maintaining said anode effluent and said cathode effluent separate from one another until in the presence of said catalyst.

2. The method of claim 1, further comprising combining said fluid stream with said oxidant stream to form a cathode feed stream and supplying said cathode feed stream to a cathode side inlet of said fuel cell stack.

3. The method of claim 1, further comprising pressurizing said accumulator with said anode effluent.

4. The method of claim 1, further comprising intermittently supplying said anode effluent from said fuel cell stack to said accumulator.

5. The method of claim 1, wherein said accumulator functions as a separator that separates said anode effluent into hydrogen and at least one of water and nitrogen and further comprising separating said anode effluent into hydrogen and at least one of water and nitrogen and selectively routing said hydrogen from said accumulator to said cathode side of said fuel cell stack.

* * * * *